July 10, 1962 F. H. RUED 3,043,146
WEIGHT ADJUSTER FOR A BALANCER
Filed Dec. 29, 1958 3 Sheets-Sheet 3

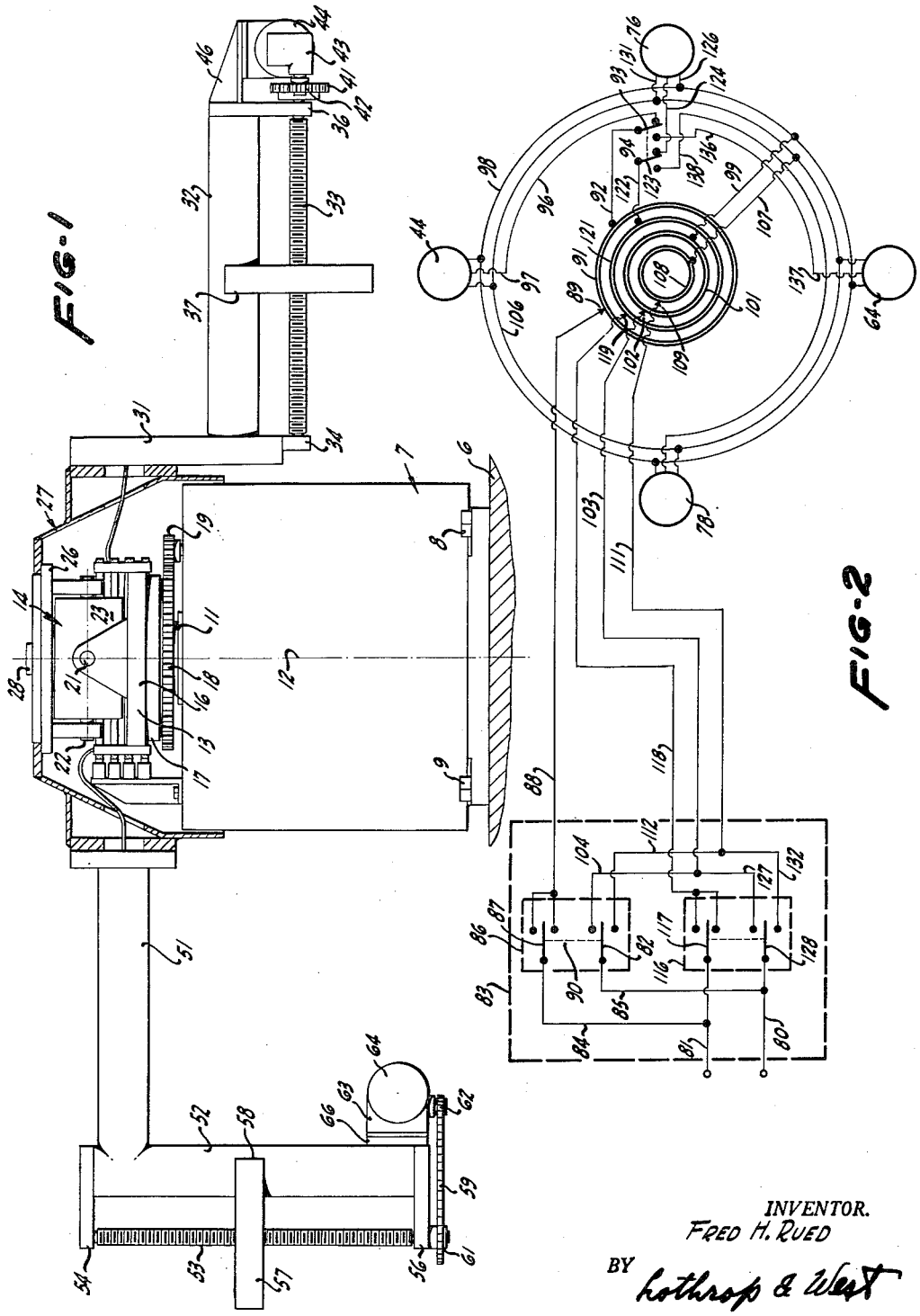

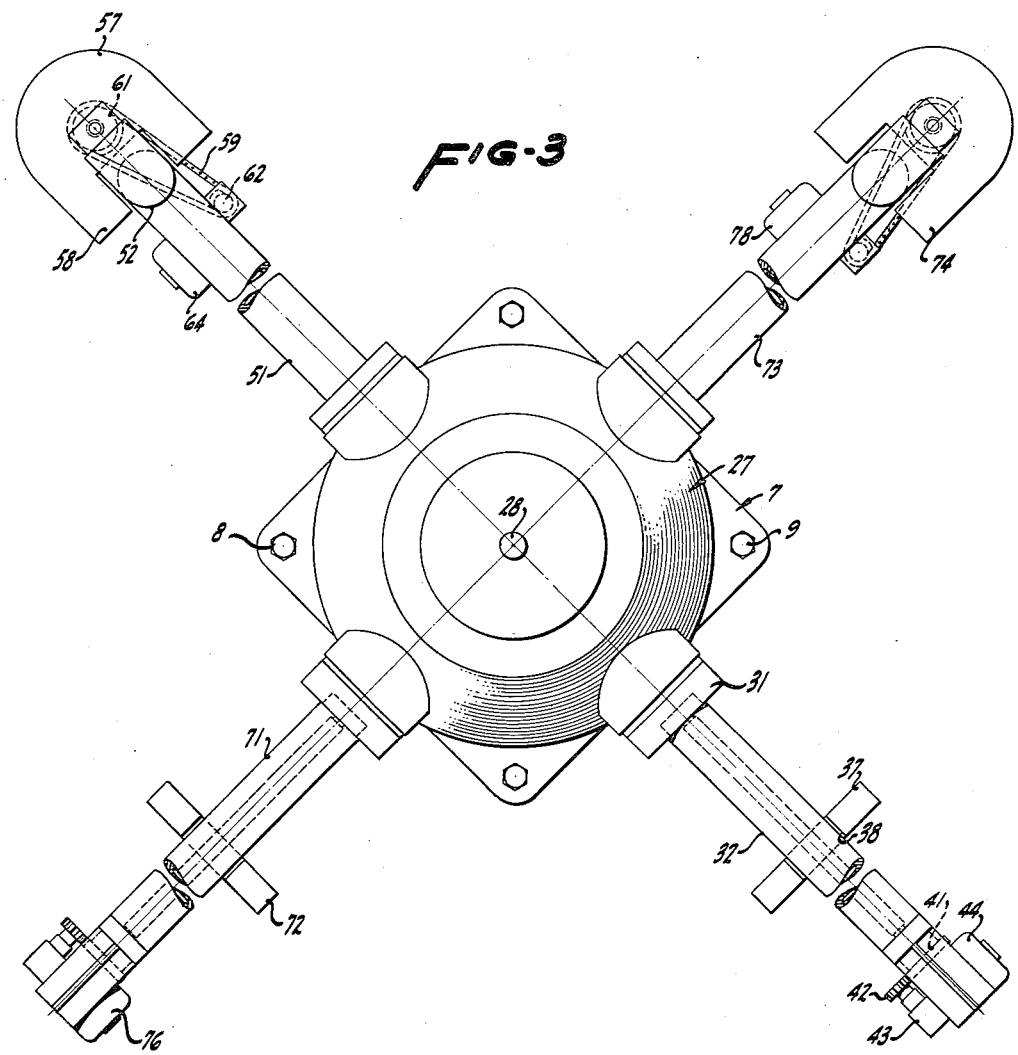

INVENTOR.
FRED H. RUED
BY Lothrop & West
ATTORNEY

United States Patent Office 3,043,146
Patented July 10, 1962

3,043,146
WEIGHT ADJUSTER FOR A BALANCER
Fred H. Rued, Lafayette, Calif., assignor to Baldwin-Lima-Hamilton Corporation, a corporation of Pennsylvania
Filed Dec. 29, 1958, Ser. No. 783,420
3 Claims. (Cl. 73—487)

My invention relates to means for use in connection with the balancing of relatively large and heavy rotary mechanisms such as hydraulic turbine runners and is concerned with the weight adjusting portion of a machine of this sort capable of balancing a body weighing in the neighborhood of 250,000 pounds. A balancer of this general sort is shown in my Patent 2,842,966 entitled "Balancer For Water Wheels," issued July 15, 1958, and in my application Serial No. 584,594 filed May 14, 1956, now Patent No. 2,940,315, both assigned to the assignee of the present invention.

While relatively low speeds are utilized in balancing large bodies and the operation is somewhat protracted, there is still a great benefit in expediting the balancing process and in making the mechanism available for use as quickly as possible, after a body to be balanced has been installed on it. Furthermore, even though the bodies to be balanced are usually very large, it is still desired to balance them as closely as possible and within very small limits of tolerance.

It is therefore an object of my invention to provide a weight adjuster for a balancer which can be manipulated quickly to go through the steps of balancing a rather large and heavy body both for static balancing and dynamic balancing.

Another object of the invention is to provide a weight adjuster for a balancer which minimizes the amount of manual labor necessary to adjust the balancing weights and to achieve the desired balanced condition of the article being handled.

Another object of the invention is to provide a means for adjusting a balancer from a relatively remote point and with a minimum amount of manual labor.

Another object of the invention is, in general, to provide an improved adjustable balancer.

Other objects, together with the foregoing, are attained in the embodiments of the invention described in the accompanying description and illustrated in the accompanying drawings, in which:

FIGURE 1 is a side elevation of a weight adjuster for a balancer constructed in accordance with the invention, a portion of the rotor being shown in a vertical planar cross-section approximately on a diametrical plane with the interior mechanism shown in side elevation.

FIGURE 2 is a wiring diagram showing electrical connections utilized in conjunction with the balancer weight adjusting mechanism.

FIGURE 3 is a plan of the structure shown in FIGURE 1.

Figure 4:
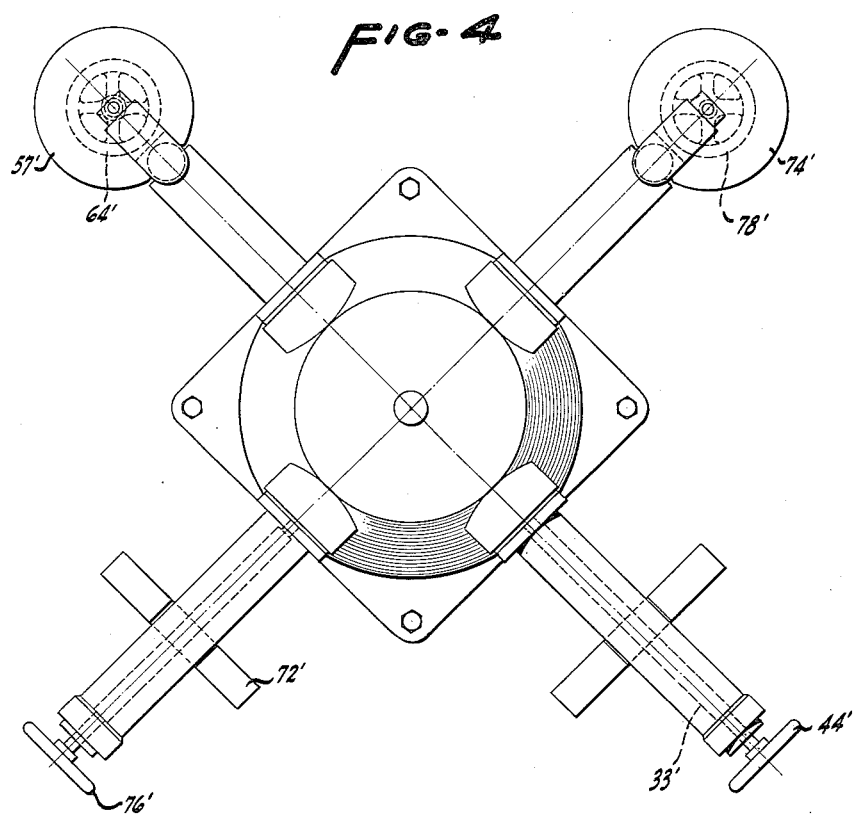
FIGURE 4 is a plan of a modified and simplified form of a weight adjuster for a balancer.

Mounted upon an appropriate foundation 6 is a pedestal 7 secured to the foundation by fasteners 8 and 9 in any convenient way. The pedestal 7 serves as a mounting for a shaft 11 disposed with its rotational axis 12 in a vertical position. The shaft 11, at its upper end, carries the lower portion 13 of a universal joint generally designated 14. The portion 13 includes a base plate 16 and a spacer plate 17 to which a drive gear 18 is fastened. A pinion 19 meshes with the gear 18 and is driven by a suitable electric motor (not shown) so that the universal joint 14 is rotated about the axis 12 at the desired speed. Included in the universal joint 14 in addition to the base plate 16 is a cross pin 21, one of a pair of such pins, disposed at 90 degrees to another pair 22 of cross pins. The pin pairs 21 and 22 project from a central body 23 and the pair of pins 22 engage an upper plate 26.

Mounted on the upper plate 26 is a rotor 27 preferably having a substantially conical form and in part overlapping the base of the pedestal 7. The rotor 27 and the upper plate 26 serve as the mounting for the object to be balanced and since this usually involves a careful centering, the top plate 26 is preferably provided with a centering boss 28.

In accordance with the invention, the rotor, as shown in FIGURE 3, is preferably provided with a plurality of radial arms. The first arm is firmly secured to the rotor 27 and preferably includes a portion 31 offset downwardly in a direction parallel to the axis 12 and is also inclusive of a radial tubular extension 32. Parallel to the extension 32 of the first arm there is provided a screw shaft 33 at its opposite ends carried rotatably in journal brackets 34 and 36 so that the screw shaft 33 can rotate but cannot be displaced endwise.

Engaging the screw shaft 33 in the manner of a nut is a balance weight 37 having a centrally threaded bore and contoured to be substantially symmetrical with respect to the axis of the screw shaft 33. The weight 37 is not only supported on the screw shaft but can be moved radially as the screw shaft is rotated. The weight 37 cannot rotate with respect to the extension 32 since the weight 37 has an arcuate cutout portion 38 in its upper zone so that the top part of the weight embraces the tubular arm extension 32 and is thus prevented from turning on the screw although it is perfectly free to move radially. The screw shaft 33 at its outboard end is provided with a gear 41 fixed thereon and with which a pinion 42 meshes. The pinion is driven through a suitable reduction gearing 43 by an electric motor 44 suspended on a bracket 46 secured to the end of the radial arm.

In a somewhat comparable fashion, there projects from the other side of the rotor 27 a second radial arm 51 preferably of tubular construction. At its outboard end the second arm carries a vertically extending tubular portion 52. Parallel to the portion 52 there is disposed a vertical screw shaft 53 at its opposite ends journalled in brackets 54 and 56 extended from the portion 52. Engaging the vertical screw shaft 53 in the manner of a nut, since its bore is appropriately threaded, is an adjustable weight 57 which is moved vertically as the screw shaft 53 is rotated. The weight 57 is prevented from rotating itself since it is provided with a cutout portion 58 which embraces the portion 52, thus precluding rotation but permitting a relative translatory motion. The screw shaft 53 is appropriately driven through a chain 59 which extends around a sprocket 61 secured to the lower end of the screw shaft and also around a sprocket 62 which is driven through a gear reduction 63 from a second electric motor 64. The motor 64 is fastened to a bracket 66 secured to the portion 52.

In a quite similar fashion, the rotor 27 is provided between the first two arms with a third radial arm 71 carrying another horizontally adjustable weight 72 and a fourth radial arm 73 opposite the third arm carrying another vertically adjustable weight 74. The weight 72 is adjustable in or out in precisely the fashion previously described whenever a motor 76 is energized appropriately whereas the weight 74 is adjusted up or down whenever a motor 78 is appropriately energized.

Pursuant to the invention and in order properly to control the various motors 44, 64, 76 and 78, there is provided an electrical mechanism, especially as shown in FIGURES 1 and 2. With this mechanism the power is received through mains 80 and 81 and is delivered into a controller 83. This is usually a box situated at a convenient point on or adjacent to the pedestal 7. Branch leads 84 and 85 extend to a double-pole, double-throw switch 86 having a blade 82 and a blade 87 coupled together by a bridge 90. In either extreme position of the blade 87 contact is made so as to put in circuit a conductor 88. This extends to a brush 89 bearing on a slipring 91 fastened onto the plate 16 of the universal joint. From the ring 91 a flexible lead 92 extends to one blade 93 of a gang switch 94 on the rotor. In the position shown in FIGURE 2, the switch establishes a circuit to a conductor 96 extending to one of the taps 97 of the motor 44. The return of this circuit from the motor 44 can be through a common conductor 98 connected through a flexible lead 99 and a ring 101 to a brush 102. The circuit continues through a conductor 103 connected to a branch conductor 104 engaged by the blade 82 of the gang switch 86 so that the circuit to the main 80 is completed through the lead 85.

When the motor 44 is to be reversed, the gang switch 86 is reversed, which leaves the conductor 88 still in circuit, but the return from the motor 44 instead of being through the conductor 98 is rather through a conductor 106 which has a flexible lead 107 extending to a collector ring 108. From this ring one of the brushes 109 establishes connection with a conductor 111 joined to a branch conductor 112 joined to the main 80 through the conductor 85 in the other position of the blade 82 of the gang switch 86. The motor 44 is thus reversed.

Somewhat similarly, within the controller 83 is a similar gang switch 116 arranged so that when its upper blade 117 is moved either upwardly or downwardly there is placed in circuit a conductor 118 extending to a brush 119 in connection with a ring 121. A flexible lead 122 then is connected to the other blade 123 of the gang switch 94 and places in circuit the center conductor 124 of the motor 76.

In this upper position of the gang switch 116 the return from the motor 76 is through a conductor 126 which joins the conductor 98 and through the flexible lead 99 permits current to flow through the collector ring 101 and the brush 102 as well as the conductor 103 into a branch 127 which is contacted by the knife 128 in its uppermost position, thus completing the circuit to the other main 80.

When the gang switch 116 is in its other or lower position the conductor 118 is still in circuit but the return from the motor 76 is then through a conductor 131 joined to the conductor 106, which through the flexible lead 107 and the ring 108 permits a connection to the brush 109 and thence through the conductor 111 and a branch conductor 132 to the blade 128, and thus to the main 80.

In accordance with the foregoing circuitry, the gang switch 86 controls the forward and reverse motion of the motor 44 whereas the gang switch 116 controls the forward and reverse motion of the motor 76. These two motors are left de-energized and the other two motors 64 and 78 are controlled by the same gang switches. This is accomplished by a change in position of the gang switch 94 mounted on the rotor to revolve with it. When the switch blades 93 and 123 of the gang switch 94 are put in their other positions (opposite to that shown in FIGURE 2) then the blade 93 is joined to a conductor 136 which extends to a tap 137 for the motor 64 while the blade 123 is then connected to a conductor 138 which extends to the corresponding tap of the motor 78. The return circuits are as previously described. Thus, when the gang switch 94 is in one position the motors 44 and 76 are controlled whereas when the gang switch 94 is in its other position the motors 64 and 78 are controlled.

In the operation of this structure, while it is stationary an article to be balanced is placed on the rotor 27 and is centered by means of the hub 28 so that it is available for rotation about the vertical axis 12. Either while the placed object is stationary or is revolved very slowly (approximately one revolution per minute) the two appropriate motors are actuated to regulate the position of the weights 37 and 72. These weights are referred to as "static" weights since they are primarily utilized in effectuating static balance. They are radially movable only and are not axially movable and are positioned radially so that their resultant offsets any static unbalance in the item being checked. The remaining weights 57 and 74 are fixed radially and are movable axially only. The motors which adjust the weights 37 and 72 are manipulated in one direction or the other until a suitable static balance has been accomplished.

Following that, the rotor is revolved at a higher rate of speed, say fifty revolutions per minute, during which time the so-called "dynamic" weights 57 and 74 are moved in an axial direction either upwardly or downwardly until they are positioned so that their resultant is effective to counterbalance the dynamic unbalance of the body being revolved. Since the weights 57 and 74 move only in an axial direction and not radially, they are, in effect, "fixed" insofar as static balance is concerned but serve to accomplish the necessary axial positioning in order to offset any dynamic unbalanced couples in the object being checked. When the shift is made from static balance to dynamic balance the gang switch 94 is thrown from one extreme position to the other so that the controlling gang switches 86 and 116 are effective on the appropriate two motors.

Figure 5:
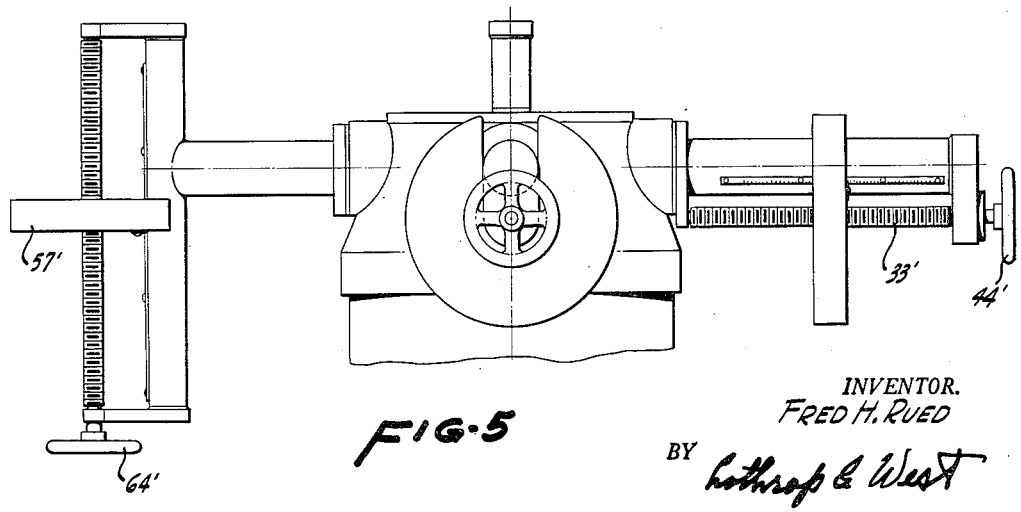
FIGURE 5 is a side elevation of the mechanism shown in FIGURE 4.

In a modification of the device there is a somewhat simplified arrangement shown in which all of the parts are as previously described except that the horizontal screw 33' is operated manually by a hand wheel 44' and the weight 72' is similarly manipulated by a hand wheel 76'. The dynamic weight 57' is adjusted axially by means of a hand wheel 64' and comparably the other dynamic weight 74' is positioned by its own hand wheel 78'. The device of FIGURES 4 and 5 is operated exactly like the device of the remaining figures except that all of the functions are accomplished by rotation of the hand wheels between rotations of the rotor. While this does eliminate all of the electrical and remote control mechanism, it does necessitate stopping the balancing device between each of a series of test runs. Both forms of device avoid the use of loose weights and the necessity of providing temporary weight fastenings.

In using the apparatus disclosed herein, a skilled operator can visually detect when a workpiece is in static balance and/or in dynamic balance. It is to be remembered that the workpieces are quite large and even the dynamic balance test is conducted at relatively low speed, making it easy to detect when the weights have been so adjusted as to eliminate all wobble or nutation. In any event the prior art is replete with disclosures of means and manners of detecting unbalance in devices of this type and such means could be employed if desired. By manipulating the adjustable weights disclosed herein, an operator can bring the workpiece and apparatus assembly into balance and by experience can know how much adjustment is necessary on the workpiece to bring it to the desired balance. As is obvious, practically any degree of static or dynamic unbalance that is likely to be encountered can be handled by the present apparatus since the relationship of each pair of arms, being less than 180° apart, permits the universal adjustment of their resultant so as to make corrections for unbalance regardless of the lateral direction thereof.

What is claimed is:

1. A weight adjuster for a balancer comprising, pedestal, a shaft mounted in said pedestal for rotation about a vertical axis, a universal joint fastened to the upper end of said shaft, a rotor fastened to said universal joint, pairs of generally radial arms extending from said rotor, the arms of each pair being angularly spaced but less than 180° apart, a radial screw shaft journalled on each arm of one pair, a weight in the form of a nut engaging each radial screw shaft, means non-rotatably guiding said weights along their respective arms, means for selectively rotating said radial screw shafts, a vertical screw shaft journalled on each arm of the other pair, a further weight in the form of a nut engaging each vertical screw shaft, means non-rotatably guiding said further weights along said vertical screw shafts, and means for selectively rotating said vertical screw shafts.

2. A weight adjuster as defined in claim 1 wherein said means for rotating said shafts comprise electric motors on said radial arms drivingly connected to said screw shafts.

3. A weight adjuster as defined in claim 1 wherein said means for rotating said shafts comprise electric motors on said radial arms drivingly connected to said screw shafts, electrical brush and slip ring mechanism on said universal joint, a controller on said pedestal, and flexible conductors connecting said motors to said controller through said brush and slip ring mechanism.

References Cited in the file of this patent

UNITED STATES PATENTS

| | | |
|---|---|---|
| 1,296,605 | Akimoff | Mar. 11, 1919 |
| 2,172,006 | Buckner et al. | Sept. 5, 1939 |
| 2,336,429 | Wenger | Dec. 7, 1943 |
| 2,547,764 | Lindenberg et al. | Apr. 3, 1951 |
| 2,696,108 | Hrebicek | Dec. 7, 1954 |
| 2,842,966 | Rued | July 15, 1958 |

FOREIGN PATENTS

| | | |
|---|---|---|
| 141,241 | Australia | May 14, 1951 |
| 1,080,687 | France | Dec. 13, 1954 |